US012579809B2

(12) United States Patent
Miseikis

(10) Patent No.: US 12,579,809 B2
(45) Date of Patent: Mar. 17, 2026

(54) INFORMATION PROCESSING DEVICES, INFORMATION PROCESSING METHODS AND VIDEO STREAMING SYSTEM

(71) Applicant: Sony Group Corporation, Tokyo (JP)

(72) Inventor: Justinas Miseikis, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 151 days.

(21) Appl. No.: 18/107,032

(22) Filed: Feb. 8, 2023

(65) Prior Publication Data

US 2023/0260282 A1    Aug. 17, 2023

(30) Foreign Application Priority Data

Feb. 15, 2022    (EP) ..................................... 22156733

(51) Int. Cl.
*G06V 20/40* (2022.01)
*G06V 10/25* (2022.01)
*G06V 10/82* (2022.01)

(52) U.S. Cl.
CPC .............. *G06V 20/44* (2022.01); *G06V 10/25* (2022.01); *G06V 10/82* (2022.01)

(58) Field of Classification Search
CPC ......... G06V 20/44; G06V 10/25; G06V 10/82
See application file for complete search history.

(56) References Cited

U.S. PATENT DOCUMENTS

| | | | | | |
|---|---|---|---|---|---|
| 11,227,409 | B1 * | 1/2022 | Wu | ....................... | H04N 17/002 |
| 11,563,909 | B1 * | 1/2023 | Chen | .................... | H04N 25/701 |

| | | | | | |
|---|---|---|---|---|---|
| 2004/0223050 | A1 * | 11/2004 | Callaci | ................. | H04N 19/527 |
| | | | | | 375/E7.257 |
| 2014/0009648 | A1 * | 1/2014 | Kim | ...................... | H04N 25/134 |
| | | | | | 348/272 |
| 2016/0011654 | A1 * | 1/2016 | Lee | ........................ | H04N 25/78 |
| | | | | | 345/156 |
| 2017/0278221 | A1 * | 9/2017 | Ji | ............................ | H04N 23/81 |
| 2018/0191972 | A1 * | 7/2018 | Berner | ................. | H04N 25/766 |
| 2018/0366048 | A1 * | 12/2018 | Kuo | ...................... | G09G 3/2003 |
| 2020/0029031 | A1 * | 1/2020 | Kubendran | ............ | H04N 25/47 |
| 2020/0218959 | A1 * | 7/2020 | Srinivasa | ................. | G06N 3/08 |
| 2020/0410272 | A1 * | 12/2020 | Seo | ........................ | H04N 25/40 |
| 2021/0312189 | A1 * | 10/2021 | Bisulco | .............. | H04L 43/0876 |

(Continued)

FOREIGN PATENT DOCUMENTS

| | | |
|---|---|---|
| CN | 110225233 A | 9/2019 |
| WO | 2021/001760 A1 | 1/2021 |

(Continued)

OTHER PUBLICATIONS

Tulyakov et al., "Time Lens: Event-based Video Frame Interpolation", IEEE Conference on Computer Vision and Pattern Recognition (CVPR), Available Online At: http://rpg.ifi.uzh.ch/docs/CVPR21_Gehrig.pdf, 2021, 14 pages.

*Primary Examiner* — Timothy R Newlin
(74) *Attorney, Agent, or Firm* — XSENSUS LLP

(57) ABSTRACT

An information processing device, including circuitry configured to:
   obtain image data representing an image of a scene;
   obtain event image data representing a change in the scene after the image is captured; and
   transmit the image data and the event image data via a communication channel to a second information processing device for generating updated image data representing an updated image of the scene.

16 Claims, 7 Drawing Sheets

(56) References Cited

U.S. PATENT DOCUMENTS

| | | | | |
|---|---|---|---|---|
| 2021/0344854 A1* | 11/2021 | Bock | | H04N 25/50 |
| 2021/0377453 A1* | 12/2021 | Nistico | | H04N 25/42 |
| 2022/0094865 A1* | 3/2022 | Seo | | H04N 25/61 |
| 2022/0210349 A1* | 6/2022 | Bong | | H04N 25/709 |
| 2022/0242317 A1* | 8/2022 | Nakagawa | | B60R 1/24 |
| 2023/0039867 A1* | 2/2023 | Li | | G06N 3/04 |
| 2023/0300282 A1* | 9/2023 | Seo | | H04N 25/00 |
| | | | | 348/294 |
| 2023/0360254 A1* | 11/2023 | Liu | | G06V 20/10 |

FOREIGN PATENT DOCUMENTS

| | | | |
|---|---|---|---|
| WO | 2021/033252 | A1 | 2/2021 |
| WO | 2021/050317 | A1 | 3/2021 |

* cited by examiner

100

200

INFORMATION PROCESSING DEVICES, INFORMATION PROCESSING METHODS AND VIDEO STREAMING SYSTEM

CROSS-REFERENCE TO RELATED APPLICATION

The present application claims priority to European Patent Application No. 22156733.2, filed Feb. 15, 2022, the entire contents of which are incorporated herein by reference.

TECHNICAL FIELD

The present disclosure generally pertains to information processing devices, information processing methods and a video streaming system.

TECHNICAL BACKGROUND

In recent years, the resolution of video recordings with cameras has improved and the data rates required to transmit high quality videos over a communication channel to receiving devices (e.g., for streaming a live video with a mobile device) has increased.

For example, with 3D and volumetric data it may already be difficult, in some cases, to transmit high-quality data to the consumer and even TV studios. Some efforts target at efficient compression algorithms with minimal loss to reduce the data transfer rates. Typical 8K video transmission, for instance, requires at least 15 Gbps data rate, usually higher to maintain high quality video.

However, there is a limitation on how much data can be compressed to ensure good lossless compression or a compression with minimal loss of data. For example, it may be a video of a static scene, which could be compressed efficiently with look-ahead algorithms, but with real-time transmissions the latency requirements are minimal, thus reducing the look-ahead time window allowed.

Furthermore, analyzing the high-quality video is typically computationally expensive resulting in further latency due to processing time as well as high computational costs in terms of hardware needed and energy costs.

Although there exist techniques for video data transmissions, it is generally desirable to improve the existing techniques.

SUMMARY

According to a first aspect the disclosure provides an information processing device, comprising circuitry configured to:

obtain image data representing an image of a scene;

obtain event image data representing a change in the scene after the image is captured; and transmit the image data and the event image data via a communication channel to a second information processing device for generating updated image data representing an updated image of the scene.

According to a second aspect the disclosure provides an information processing device, comprising circuitry configured to:

receive, via a communication channel, image data representing an image of a scene;

receive, via the communication channel, event image data representing a change in the scene after the image is captured; and generate updated image data representing an updated image of the scene, based on the image data and the event image data.

According to a third aspect the disclosure provides a video streaming system, comprising:

a first information processing device, including circuitry configured to:

obtain image data representing an image of a scene, obtain event image data representing a change in the scene after the image is captured, transmit the image data and the event image data via a communication channel to a second information processing device for generating updated image data representing an updated image of the scene; and the second information processing device, including circuitry configured to:

receive, via the communication channel, the image data, receive, via the communication channel, the event image data, generate the updated image data, based on the image data and the event image data.

According to a fourth aspect the disclosure provides an information processing method, comprising:

obtaining image data representing an image of a scene;

obtaining event image data representing a change in the scene after the image is captured; and transmitting the image data and the event image data via a communication channel to a second information processing device for generating updated image data representing an updated image of the scene.

According to a fifth aspect the disclosure provides an information processing method, comprising:

receiving, via a communication channel, image data representing an image of a scene;

receiving, via the communication channel, event image data representing a change in the scene after the image is captured; and generating updated image data representing an updated image of the scene, based on the image data and the event image data.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
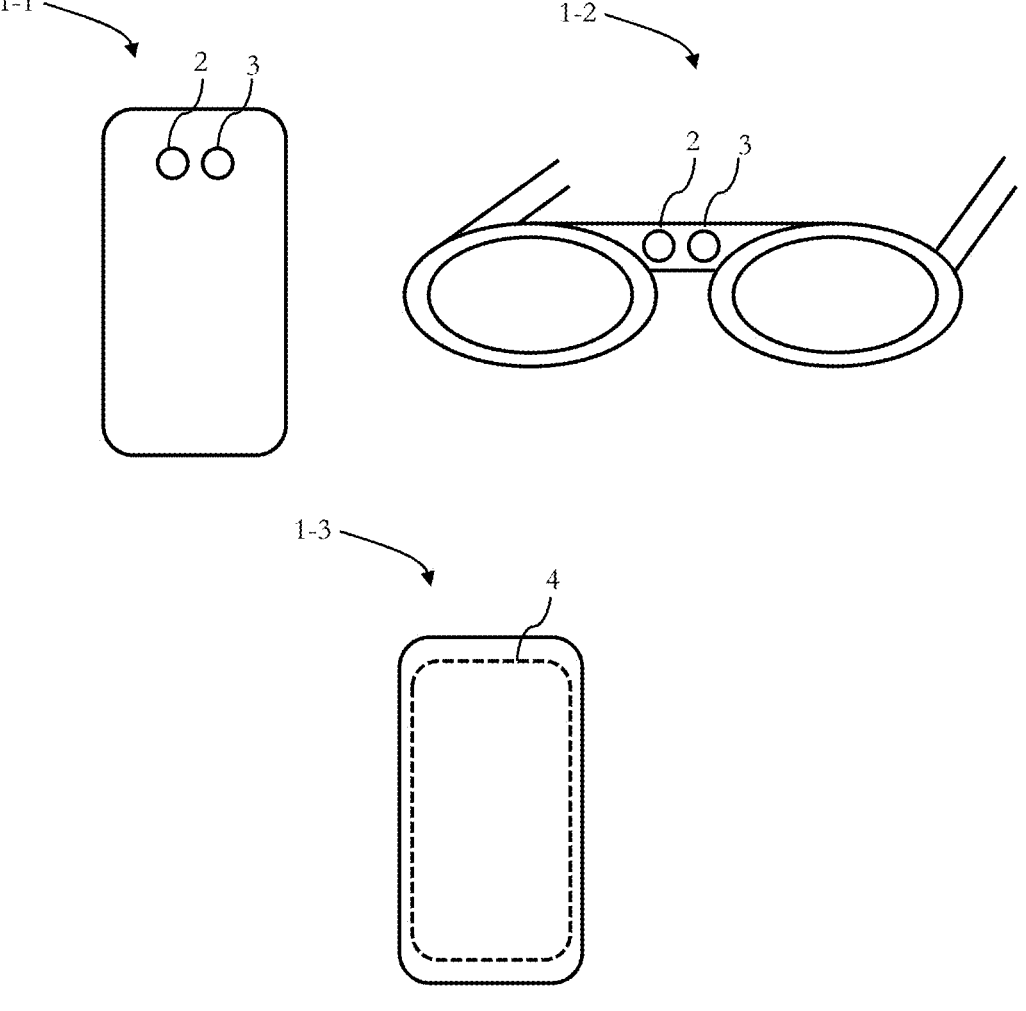
FIG. 1 schematically illustrates two embodiments of a first information processing device and an embodiment of a second information processing device.

Before a detailed description of the embodiments under reference of FIG. 1 is given, general explanations are made.

As mentioned in the outset, in recent years, the resolution of video recordings with cameras has improved and the data rates required to transmit high quality videos over a communication channel to receiving devices (e.g., for streaming a live video with a mobile device) has increased.

Some efforts target at efficient compression algorithms with minimal loss to reduce the data transfer rates, as generally known.

However, there is a limitation on how much data can be compressed to ensure good lossless compression or a compression with minimal loss of data. For example, it may be a video of a static scene, which could be compressed efficiently with look-ahead algorithms, but with real-time transmissions the latency requirements are minimal, thus reducing the look-ahead time window allowed.

It has been recognized that event cameras may be utilized to reduce a transmission data rate.

Generally, event cameras are known which detect changes in a scene instead of capturing a full image of the scene and, thus, a data amount may be lower which may result in lower data rates when transmitted to a receiving device.

It has further been recognized that, when event cameras are combined with high-quality visual cameras, the event cameras may provide additional information corresponding to any changes in the captured scene, for example, between the frames and even in-between the frames.

Thus, it has been recognized that, in some embodiments, an amount of video data transferred from the first to the second information processing device may be reduced by transmitting fewer frames when the scene is more static, and the first information processing device may determine to send a new frame only when more significant changes happen.

Moreover, it has been recognized that, in some embodiments, events generated by the event camera may be transmitted asynchronously as changes happen at higher rates to account for any, even small, changes in the scene. Thus, a variable frame rate of high-quality visual cameras may be transmitted, or even only parts of the frame may be sent while a static background would stay the same and no data would be sent for the parts of the scene where nothing has changed.

It has further been recognized that, in order to ensure smooth viewing experience, the receiving device may infer intermediate frames using the information transmitted by the transmitting device from an event camera.

Additionally, it has been recognized that a neural network may be trained to generate intermediate frames by using the latest visual frame and the intermediate information coming from the event camera.

This combination may be adapted to many broadcasting services and streaming visual cameras information to viewing devices like phones for preview of what is being filmed over limited throughput connection like internet or WiFi.

Hence, some embodiments pertain to a(n) (first) information processing device, wherein the (first) information processing device includes circuitry configured to:
obtain image data representing an image of a scene;
obtain event image data representing a change in the scene after the image is captured; and transmit the image data and the event image data via a communication channel to a second information processing device for generating updated image data representing an updated image of the scene.

Some embodiments pertain to a(n) (second) information processing device, wherein the (second) information processing device includes circuitry configured to:
receive, via a communication channel, image data representing an image of a scene;
receive, via the communication channel, event image data representing a change in the scene after the image is captured; and
generate updated image data representing an updated image of the scene, based on the image data and the event image data.

Some embodiments pertain to a video streaming system, wherein the video streaming system includes:
a first information processing device, including circuitry configured to:
obtain image data representing an image of a scene,
obtain event image data representing a change in the scene after the image is captured,
transmit the image data and the event image data via a communication channel to a second information processing device for generating updated image data representing an updated image of the scene; and
the second information processing device, including circuitry configured to:
receive, via the communication channel, the image data,
receive, via the communication channel, the event image data,
generate the updated image data, based on the image data and the event image data.

The first and the second information processing device may be mobile device (e.g., a smartphone or tablet), smart glasses, a security camera, a television camera, video capturing devices (for professional production) used for streaming live TV, or the like.

The circuitry of the first and second information processing device may be configured as follows:

The circuitry may be based on or may include or may be implemented by typical electronic components configured to achieve the functionality as described herein.

The circuitry may be based on or may include or may be implemented as integrated circuitry logic and the functionality may be implemented by software executed by a processor or the like. The circuitry may be based on or may include or may be implemented by a CPU (central processing unit), a microcontroller, an FPGA (field programmable gate array), an ASIC (application specific integrated circuit), a GPU (graphical processing unit), a DSP (digital signal processor) or the like.

The circuitry may be based on or may include or may be implemented in parts by typical electronic components and integrated circuitry logic and in parts by software.

The circuitry may include storage capabilities such as magnetic storage, semiconductor storage, etc.

The circuitry may include a data bus for transmitting and receiving data and may implement corresponding communication protocols.

The circuitry may include a user interface for obtaining user input and may include a display for displaying information such as images or videos.

The image data may be gray-scale image data or color image data (e.g., red-green-blue ("RGB") image data) obtained from a camera and the image data may include pixel values for each image pixel of a plurality of image pixels of an image sensor (grey-scale image sensor, RGB sensor) of the camera. The image data may be represented by an array or matrix including pixel values arranged with dimensions corresponding to the image sensor (e.g., number of rows and columns) or a pixel region of the image sensor (e.g., number of rows and columns) associated with an overlap region of the camera's and event camera's field-of-view (see also FIG. 2).

In some embodiments, the circuitry of the first information processing device includes a camera configured to acquire the image data.

As mentioned above, generally, event cameras are known which include an event image sensor including a plurality of event image pixels for generating events. Typically, an event image sensor differs from a conventional image sensor in that each event image pixel asynchronously and independently detects changes in the amount of light incident onto the event image pixel such that the dynamic of a scene is captured rather than a static image of the scene. This may result in a high temporal resolution, low latency, high dynamic range, and low power consumption of event cameras.

As generally known, an event image sensor may generate an event based on an electric signal from an event image pixel (which may also be referred to as event-based vision sensor pixel) in response to a detected change of the amount of light exceeding a threshold. Such an event may identify an event image pixel that generated the event (e.g., column and row index in an event image pixel array), a time when the event was generated, and a polarity indicating whether the change is an increase or decrease of the amount of light.

Typically, the events indicate a change in brightness (or grey-scale value), however, the events may be associated with a color change, for example, when a color filter is used in the event camera.

Thus, the circuitry of the first and the second information processing device may receive continuously and asynchronously events (associated with an event image pixel) from an event camera and from the first information processing device, respectively.

The circuitry of the first and the second information processing device may obtain the event image data based on the received events, wherein each event is associated with an event image pixel of the event camera that generated the event. The event image data may be represented by an array or matrix including the events (including polarity) arranged with dimensions corresponding to the event image sensor (e.g., number of rows and columns) or a pixel region of the event image sensor (e.g., number of rows and columns) associated with an overlap region of the camera's and event camera's field-of-view (see also FIG. 2). The event image data may correspond to integrated events.

The circuitry of the first and the second information processing device may obtain the event image data when a predetermined number of events is received or when a predetermined amount of time has elapsed. However, the circuitry of the first and the second information processing device may adapt the predetermined amount of time depending on a number of events received within a predetermined time interval.

In some embodiments, the circuitry of the first information processing device includes an event camera configured to acquire events representing the event image data. Different types of event image sensors including, e.g., an event image pixel array is known, for example, Dynamic Vision Sensor (DVS), Asynchronous Time Based Image Sensor (ATIS) or Dynamic and Active Pixel Vision Sensor (DA-VIS), which may be used in some embodiments.

Figure 2:
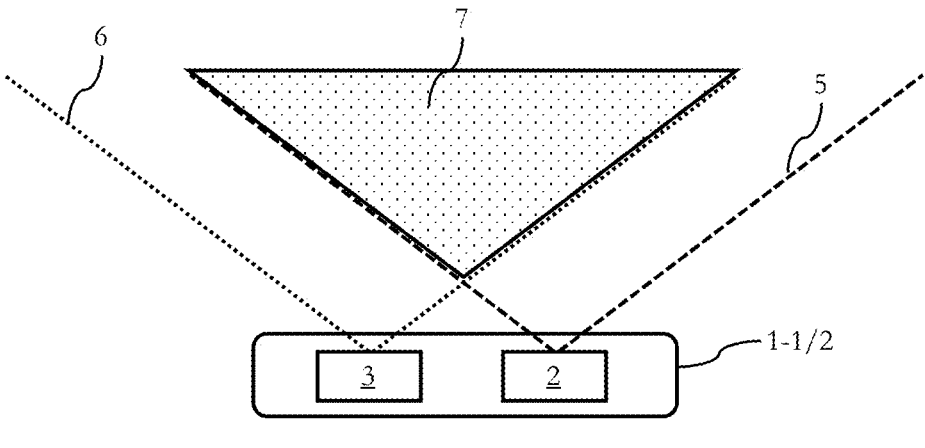
FIG. 2 schematically illustrates an embodiment of a setup of a camera and an event camera of a first information processing device.

The setup of the camera and the event camera (of the first information processing device) is calibrated such that the camera and the event camera have at least a predetermined part of their field-of-views which overlap such that at least a part of the image pixels of the image sensor is associated with an event image pixel of the event image sensor (see also FIG. 2). The number of each type of camera and the layout may be different depending on the form factor, requirements and the use case of the smart glasses or the mobile device.

The first information processing device (the circuitry thereof) transmits the image data and the event image data via a communication channel to the second information processing device for generating updated image data representing an updated image of the scene.

The communication channel may a wired or wireless communication channel (e.g., via a mobile telecommunications system).

In some embodiments, the first information processing device (the circuitry thereof) transmits the event image data in accordance with a video frame rate.

For example, the second information processing device expects a certain frame rate for reproducing the video for display to the user and, thus, the event image data is transmitted accordingly.

The second information processing device (the circuitry thereof) generates updated image data representing an updated image of the scene, based on the image data and the event image data.

In some embodiments, the events are integrated for each event image pixel for estimating a pixel value change (grey-scale or RGB value), and the updated image data is generated by accounting for the estimated pixel value change in the image data (for each image pixel associated with the event image pixel that generated the event(s)).

In some embodiments, the circuitry of the second information processing device is further configured to input the image data and the event image data into a neural network, wherein the neural network is trained to generate the updated image data based on the image data and the event image data. Such embodiments are discussed under reference of FIG. 3, FIG. 4, FIG. 5 and FIG. 6.

In some embodiments, the circuitry of the first information processing device is further configured to adapt a rate at which the event image data is transmitted, based on a number of events generated within a predetermined time interval.

On the one hand, the circuitry may detect that the scene is static, based on the number of events generated within the predetermined time interval and, thus, the circuitry may reduce the rate at which the event image data is transmitted.

On the other hand, the circuitry may detect that the scene is dynamic, based on the number of events generated within the predetermined time interval and, thus, the circuitry may increase the rate at which the event image data is transmitted.

Moreover, as mentioned above, it has been recognized that, in some embodiments, an amount of video data transferred from the first to the second information processing device may be reduced by transmitting fewer frames when the scene is more static, and the first information processing device may determine to send a new frame only when more significant changes happen.

Hence, in some embodiments, the circuitry of the first information processing device is further configured to instruct a camera to acquire second image data representing a second image of the scene.

In such embodiments, the second image data represents a current image of the scene (subsequent to the image represented by the image data and subsequent to the updated image data (updated based on the event image data)).

In some embodiments, the circuitry of the first information processing device is further configured to transmit the second image data to the second information processing device.

In such embodiments, the second image data is updated based on event image data representing a change in the scene after the current image is captured (thus, the updating process starts again).

In some embodiments, the circuitry of the first information processing device is further configured to adapt a rate at which the camera is instructed to acquire the second image data and at which the second image data is transmitted to the second information processing device, based on a number of events generated within a predetermined time interval.

In some embodiments, the circuitry of the first information processing device is further configured to transmit events asynchronously, instead of transmitting the event image data, when a number of events generated within a predetermined time interval exceeds a predetermined threshold.

Accordingly, in some embodiments, the circuitry of the second information processing device is further configured to receive, via the communication channel, events asynchronously, instead of receiving the event image data, and to generate the updated image data based on the received events.

In some embodiments, the circuitry of the first information processing device is further configured to detect whether a predetermined change has occurred in the scene, based on the event image data.

The predetermined change may be, for instance, the entering of a new object or a person into the scene (e.g., into the overlapping field-of-view of the camera and the event camera), a particular movement of an object or a person in the scene (e.g., in the overlapping field-of-view of the camera and the event camera) or of parts of the object or the scene, a number of events that have occurred in a predetermined time interval exceeding a predetermined threshold (e.g., within the overlapping field-of-view of the camera and the event camera) or that have occurred in a predetermined region of the scene (e.g., in a predetermined region of the overlapping field-of-view of the camera and the event camera) or that follow a predetermined spatial distribution, a change in illumination conditions (e.g., a cloud moving in front of the sun such that, for example, a larger area of the scene gets darker), or the like, wherein such changes may be typically represented in the event image data.

In some embodiments, the circuitry of the first information processing device is configured to input the event image data into a machine learning algorithm (e.g., a decision tree, a support vector machine, a neural network, etc.), wherein the machine learning algorithm is trained to detect whether a predetermined change has occurred.

For example, the machine learning algorithm may be trained with a plurality of event image data (sets) representing a predetermined change such that the machine learning algorithm learns to identify patterns in the event image data which are indicative for the predetermined change.

In some embodiments, the predetermined change is application specific.

For example, the application may be an AR application for a security camera. In such an example, the application may overlay information about persons in the field-of-view and the predetermined change may correspond to the entering of a person in the field-of-view. Accordingly, the machine learning algorithm may be trained to detect such changes.

This may provide, for instance, a filter such that a current image is only acquired when a new person enters the field-of-view, thereby reducing the need to process a large amount of image data frequently.

In some embodiments, the predetermined change is detected further based on the image data.

For example, the circuitry of the first information processing device may detect, based on the image data, whether predetermined objects or whether persons are present in the scene such that the circuitry may adapt the predetermined change accordingly (e.g., may select it accordingly from a predetermined list).

In some embodiments, the circuitry of the first information processing device is further configured to instruct, when the predetermined change is detected, a camera to acquire second image data representing a second image of the scene.

In such embodiments, the second image data represents a current image of the scene (subsequent to the image represented by the image data and subsequent to the updated image data (updated based on the event image data)).

In some embodiments, the circuitry of the first information processing device is further configured to transmit the second image data to the second information processing device.

In such embodiments, the second image data is updated based on event image data representing a change in the scene after the current image is captured (thus, the updating process starts again).

In some embodiments, the circuitry of the first information processing device is further configured to detect a region of interest in the scene, based on at least one of the image data and the event image data.

The region of interest generally corresponds to a part of the scene (e.g., of the overlapping field-of-view of the camera and the event camera) which is assigned a higher importance to be processed (for the application) than the rest of the scene. The regions of interest may be continuously detected and may change over the time.

The importance and thus the region of interest may be based on a number of events generated in a region of the scene (corresponding to an image pixel region on the image sensor of the camera and to an event image pixel region on the event image sensor of the event camera) indicating a larger dynamic of this region of the scene, whether an object or a person is detected (e.g., in front of a background) in a region of the scene, or the like.

In some embodiments, the circuitry of the second information processing device is configured to input the image data into a neural network, wherein the neural network is trained to detect whether and where objects or persons are present in the image of the scene.

Typically, events may be generated at edges of objects or persons or generally at transitions from one object to another object or to a background.

The region of interest may thus, for example, be hands of a person, a face of a person, an object, parts of an object, the contour or silhouette of an object or person.

Hence, the region of interest of interest may be detected based on the image data or based on the event image data or based on both.

In some embodiments, the circuitry of the first information processing device is further configured to transmit only the part of the event image data corresponding to the region of interest.

In some embodiments, the circuitry of the second information processing device is further configured to generate the updated image data based on the region of interest represented in the image data.

In such embodiments, the second information processing device only processes a subset of the image data corresponding to the region of interest for generating the updated image data.

In some embodiments, the circuitry of the second information processing device is further configured to generate the updated image data based on the region of interest represented in the event image data.

In such embodiments, the second information processing device only processes a subset of the event image data corresponding to the region of interest for generating the updated image data.

In some embodiments, the circuitry of the first information processing device is further configured to adapt a rate at which the event image data is transmitted, based on a number of events generated in the region of interest within a predetermined time interval.

Some embodiments pertain to a(n) (first) information processing method, wherein the (first) information processing method includes:

obtaining image data representing an image of a scene;
  obtaining event image data representing a change in the scene after the image is captured; and
  transmitting the image data and the event image data via a communication channel to a second information processing device for generating updated image data representing an updated image of the scene.

The (first) information processing method may be performed by the first information processing device as described herein.

Some embodiments pertain to a(n) (second) information processing method, wherein the (second) information processing method includes:

receiving, via a communication channel, image data representing an image of a scene;
  receiving, via the communication channel, event image data representing a change in the scene after the image is captured; and
  generating updated image data representing an updated image of the scene, based on the image data and the event image data.

The (second) information processing method may be performed by the second information processing device as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there are schematically illustrated two embodiments of a first information processing device 1-1 and 1-2 and an embodiment of a second information processing device 1-3.

The first information processing device 1-1 is a smartphone and includes a camera 2 and an event camera 3.

The first information processing device 1-2 corresponds to smart glasses and includes a camera 2 and an event camera 3.

The second information processing device 1-3 is a smartphone and includes a touch display 4 providing a user interface to obtain user input and a display for displaying images or videos.

FIG. 2 schematically illustrates an embodiment of a setup of the camera 2 and the event camera 3 of the first information processing device 1-1 or 1-2.

The camera 2 and the event camera 3 in each of the first information processing devices 1-1 and 1-2 are calibrated.

The camera 2 and the event camera 3 have a predetermined distance to each other and calibrated imaging properties.

The camera 2 has a field-of-view 5—indicated by the dashed line—which overlaps with a field-of-view 6—indicated by the dotted line—of the event camera 3 in a region 7—indicated by the dotted area in FIG. 2.

Each of the first information processing devices 1-1 and 1-2 processes only the image data and the event image data corresponding to the overlap region 7 (e.g., in the camera 2, the overlap region 7 is associated with a certain image pixel region of the image sensor; in the event camera 3, the overlap region 7 is associated with a certain event image pixel region of the event image sensor).

Figure 3:
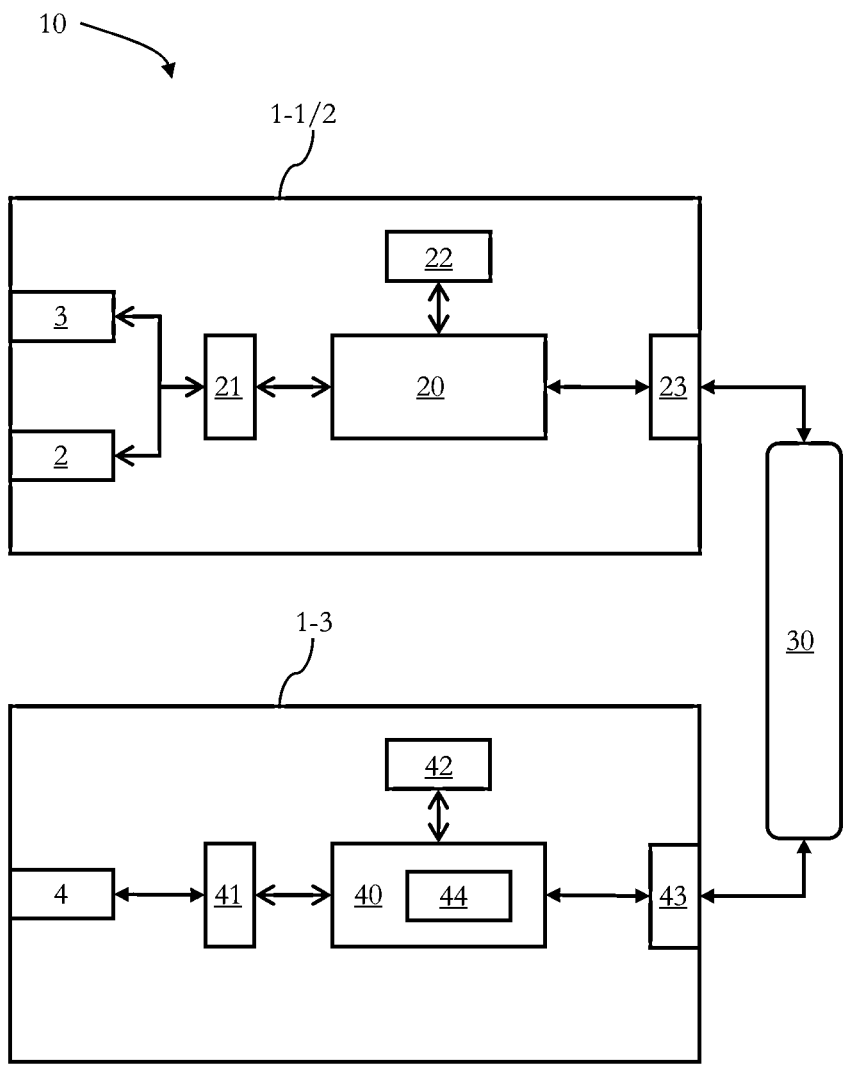
FIG. 3 schematically illustrates in a block diagram an embodiment of a video streaming system.

FIG. 3 schematically illustrates in a block diagram an embodiment of a video streaming system 10.

The video streaming system 10 includes one of the first information processing devices 1-1 or 1-2, the second information processing device 1-3, and a communication channel (e.g., a communication channel provided by a mobile telecommunications system).

As mentioned above, each of the information processing devices 1-1 and 1-2 includes the camera 2 and the event camera 3.

Moreover, each of the first information processing devices 1-1 and 1-2 includes a first processor 20 (e.g., an application processor), a first data bus 21 (e.g., a data bus in accordance with MIPI ("Mobile Industry Processor Interface") specifications) for exchanging data with the camera 2 and the event camera 3, a first data storage 22 (e.g., for storing image data and event image data), and a first communication interface (e.g., a communication interface providing the communication channel 30 via the mobile telecommunications system).

A user of the first information processing device 1-1 or 1-2 may instruct (e.g., via a user interface) to start a video streaming application to stream a video to the second information processing device 1-3. The video streaming application is loaded by the first processor 20 from the first data storage 22.

The second information processing device 1-3 includes a second processor 40 (e.g., an application processor), a second data bus 41 (e.g., a data bus in accordance with MIPI ("Mobile Industry Processor Interface") specifications) for exchanging data with the touch display 4, a second data storage 42 (e.g., for storing image data and event image data), and a second communication interface (e.g., a communication interface providing the communication channel 30 via the mobile telecommunications system).

A user of the second information processing device 1-3 may instruct (e.g., via the touch display 4) to start a video streaming application to receive the video stream from the first information processing device 1-1 or 1-2. The video streaming application is loaded by the second processor 40 from the second data storage 42.

The camera 2 transmits the image data over the first data bus 21 to the first processor 20.

The first processor 20 further instructs the event camera 3 to acquire events representing event image data after the image is captured, wherein the event image data represent a change in the scene after the image is captured.

The event camera 3 asynchronously and continuously outputs generated events and transmits the generated events over the first data bus 21 to the first processor 20.

The first processor 20 outputs the image data and the event image data to the first communication interface 23 which transmits the image data and the event image data to the second information processing device 1-3 via the communication channel 30.

The second communication interface 43 receives the image data and the event image data via the communication channel 30 and outputs the image data and the event image data to the second processor 40.

The second processor 40 executes, among other procedures, a neural network 44.

Then, the second processor 40 generates updated image data representing an updated image of the scene, based on the image data and the event image data.

Specifically, the second processor 40 inputs the image data and the event image data into the neural network 44, wherein the neural network 44 is trained to generate updated image data based on the image data and the event image data.

The second processor 40 transmits the image data and the updated image data to the touch display 4 via the second data bus 41 for displaying the video or buffers the image data and the updated image data in the second data storage 42.

The training of the neural network 44 will be discussed in the following under reference of FIG. 4.

Figure 4:
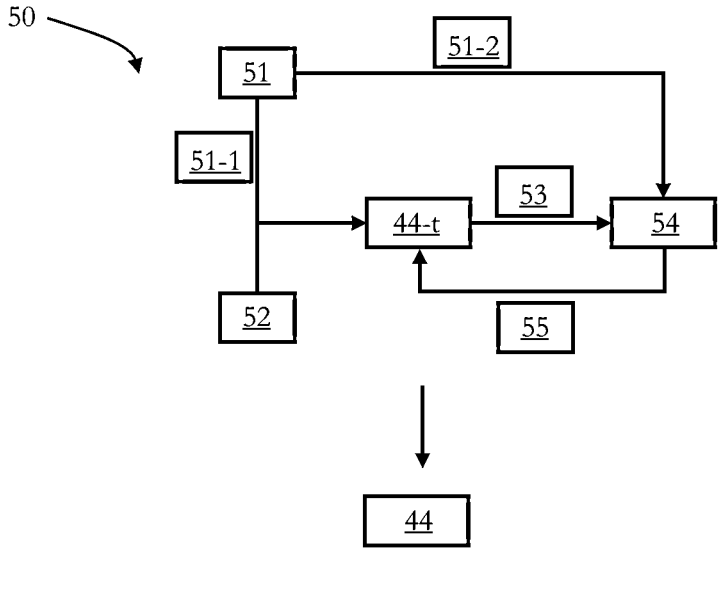
FIG. 4 schematically illustrates an embodiment of a training of a neural network.

FIG. 4 schematically illustrates an embodiment of a training 50 of the neural network 44.

In the beginning of the training 50, the neural network 44 (e.g., a convolutional neural network) is in a training stage 44-t.

The training 50 is based on ground-truth video data 51, in particular, the ground-truth video data 51 include a plurality of videos. The ground-truth video data 51 are high-speed video data and may correspond to real or simulated data or a combination thereof.

Each video of the plurality of videos includes a plurality of subsequent images (as generally known) of a scene in which changes occur.

The training 50 is further based on ground-truth event video data 52, in particular, the ground-truth event video data 52 include a plurality of subsequent event image data.

Each event image data correspond to changes in the scene occurring in the corresponding video of the ground-truth video data (hence, one video is associated with certain event image data).

The following describes the training for one video which is then repeated for the other videos.

During the training 50, a first image 51-1 of the video (of the ground-truth video data 51) is input into the neural network 44-t in the training stage.

Moreover, during the training 50, the event image data of the corresponding video is input into the neural network 44-t in the training stage.

The neural network 44-t in the training stage outputs updated image data 53, based on the first image and the event image data of the corresponding video.

Specifically, the event image data include a plurality of sub-event image data, wherein each sub-event image data correspond to a different time interval of the video in which changes occur.

Hence, based on the first image 51-1 (represented by first image data) and first sub-event image data (representing changes in the scene in a first time interval of the video), the neural network 44-t in the training stage generates first updated image data (representing an updated image of the scene).

Then, based on the first updated image data and second sub-event image data (representing changes in the scene in a second time interval of the video subsequent to the first time interval of the video), the neural network 44-t in the training stage generates second updated image data.

This is iteratively repeated until each of the plurality of sub-event image data are processed.

Then, the neural network 44-t in the training stage outputs plurality of updated image data 53 to a loss function 54.

The loss function 54 further obtains the rest of the image data of the video 51-2.

Based on a difference between the plurality of updated image data 53 and the rest of the image data of the video 51-2 (each updated image data is compared with the corresponding image data of the video), the loss function 54 generates weight updates 55 for the neural network 44-t in the training stage.

Once the training is completed (all videos are processed), the weights or parameters of the neural network 44 are obtained and, thus, the (trained) neural network 44 is obtained.

Figure 5:
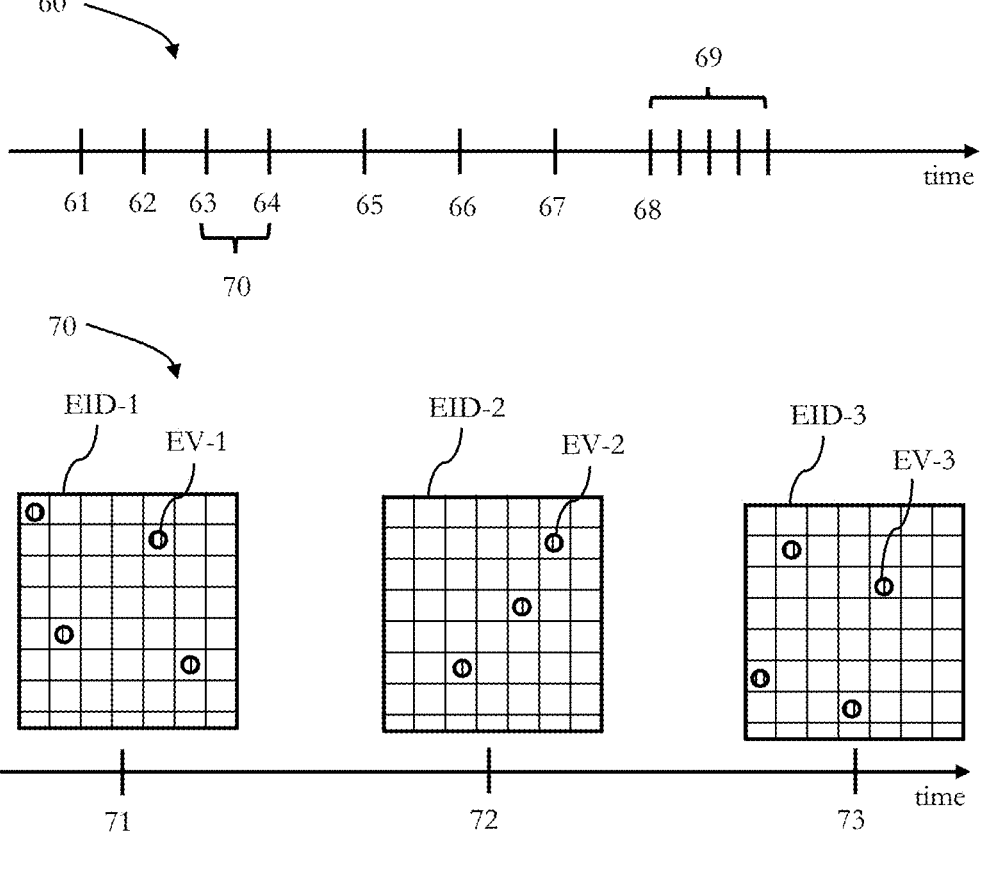
FIG. 5 schematically illustrates an embodiment of an information processing method.

FIG. 5 schematically illustrates an embodiment of an information processing method 60.

The information processing method 60 is performed by any of the first information processing devices 1-1 and 1-2 of FIG. 3 and the second information processing device 1-3 of FIG. 3.

Generally, the upper timeline in FIG. 5 illustrates time points 61 to 69 at which the camera 2 of the first information processing device 1-1 or 1-2 acquires image data representing an image of a scene which are then transmitted via the communication channel 30 to the second information processing device 1-3.

In this embodiment, at 61 to 64, the camera 2 is instructed by the first processor 20 to acquire image data regularly at a first image rate.

Between each of the time points 61 to 64, the first information processing device 1-1 or 1-2 obtains event image data at a first event image rate, based on events received from the event camera 3, and the first information processing device 1-1 or 1-2 transmits the event image data at the first event image rate to the second information processing device 1-3.

The second information processing device 1-3 generates updated image data of, for example, based on the image data received at 61 and the event image data received between 61 and 62, then based on the image data received at 62 and the event image data received between 62 and 63, and so on.

The second information processing device 1-3 generates the updated image data by inputting the respective image data and the respective event image data into the neural network 44.

The process 70 between 63 and 64 illustrates the obtaining and transmission of event image data by the first information processing device 1-1 or 1-2.

At 71 to 73, the first information processing device 1-1 or 1-2 obtains first, second and third event image data (EID-1, EID-2, EID-3), based on first, second and third events (EV-1, EV-2, EV-3), and transmits the first, second and third event image data (EID-1, EID-2, EID-3) in accordance with the first event image rate to the second information processing device 1-3.

Moreover, the first information processing device 1-1 and 1-2 detects that only few events are generated between each time interval 71 to 72 and 72 to 73 and, thus, determines that the scene is rather static.

Hence, the first information processing device 1-1 and 1-2 adapts a rate at which the camera is instructed to acquire the image data and at which the image data is transmitted to the second information processing device 1-3, based on a number of events generated within a predetermined time interval.

Specifically, as the number of events is rather low, the first image rate is decreased to a second image rate.

Hence, the time interval between 64 and 65, 65 and 66, 66 and 67, 67 and 68 is longer than the time interval between 61 and 62, 62 and 63, 63 and 64.

Moreover, the first information processing device 1-1 and 1-2 adapts a rate at which the event image data is transmitted, based on a number of events generated within a predetermined time interval.

Specifically, the time interval between consecutive event image data transmission is increased between 64 and 65, 65 and 66, 66 and 67, 67 and 68 compared to, for example, the time interval between 71 and 72, 72 and 73.

Thus, a data amount to be transmitted is reduced.

However, the first information processing device 1-1 or 1-2 detects that a number of events generated between 67 and 68 exceeds a predetermined threshold and, thus, determines that the scene is rather dynamic.

Hence, instead of transmitting the event image data synchronously, the first information processing device 1-1 or 1-2 transmits the events received from the camera 2 asynchronously to the second information processing device 1-3 (which receives it accordingly) for allowing the second information processing device 1-3 to increase an update rate of the image data (generates generate the updated image data (input to neural network 44) based on the asynchronously received events).

Moreover, as the number of events is rather high, the second image rate is increased to a third image rate which is higher than the first and the second image rate, as illustrated by 69.

Figure 6:
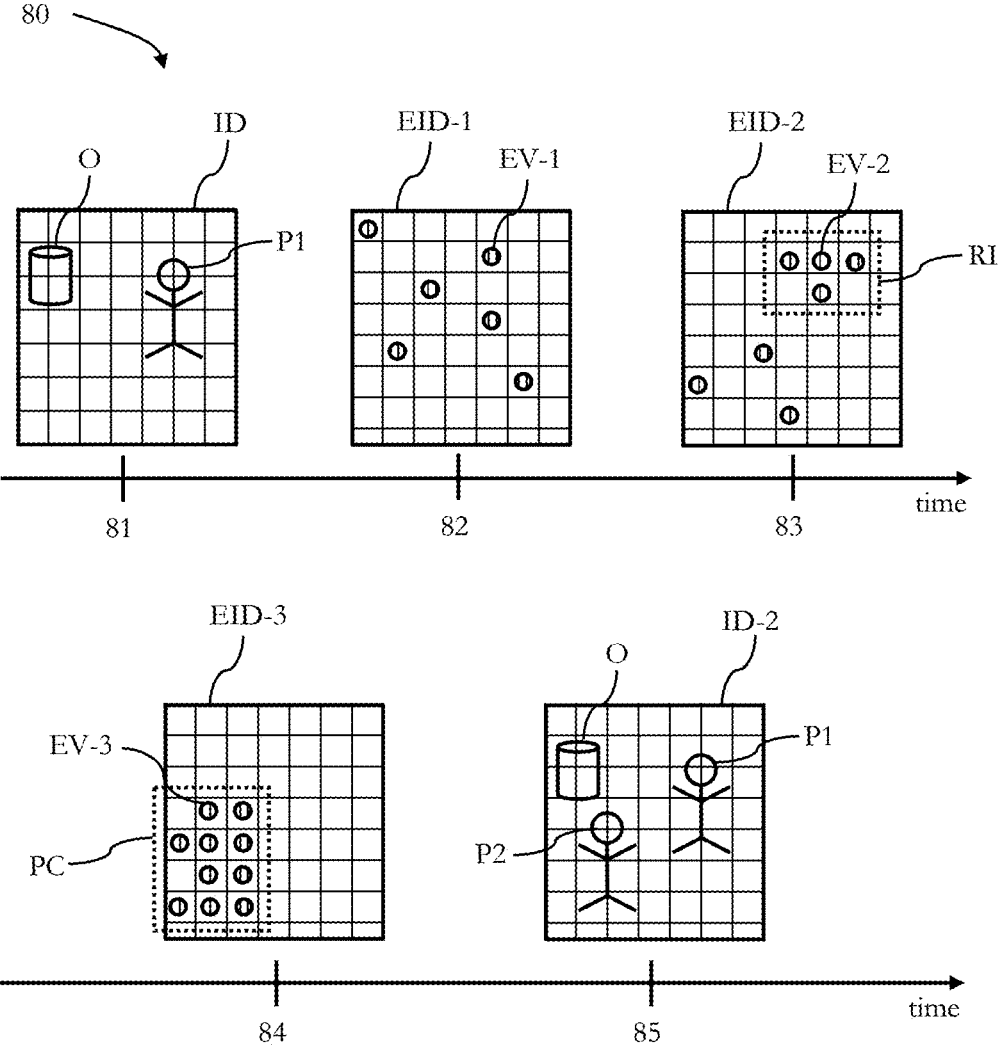
FIG. 6 schematically illustrates an embodiment of an information processing method.

FIG. 6 schematically illustrates an embodiment of an information processing method 80.

The information processing method 80 is performed by any of the first information processing devices 1-1 and 1-2 of FIG. 3 and the second information processing device 1-3 of FIG. 3.

At 81, the camera 2 acquires image data (ID) representing an image of a scene in which, for illustration, a static object (O) and a first person (P1) is represented. The camera 2 transmits the image data (ID) over the first data bus 21 to the first processor 20.

The image data (ID) is illustrated here as an array corresponding to the image pixel region of the image sensor of the camera 2 associated with the overlap region 7 (see FIG. 2) and, thus, the object (O) and the first person (P1) are detected by certain image pixels of the image sensor of the camera 2.

Moreover, the first processor 20 inputs the image data into a neural network (not shown; not to be confused with the neural network 44) which is trained to detect whether and where objects or persons are present in the image of the scene.

At 82, the event camera 3 acquires first events (EV-1) during a time interval between 81 and 82. The event camera 3 transmits the first events (EV-1) asynchronously and continuously to the first processor 20.

The first processor 20 obtains the first events (EV-1) and obtains first event image data (EID-1) therefrom. The first events (EV-1) are distributed over the overlap region 7 (the image pixel region associated with the overlap region 7 and the event image pixel region associated with the overlap region 7 are illustrated here as mapped on each other).

Then, the first processor 20 transmits the image data (ID) and the first event image data (EID-1) to the second information processing device 1-3 via the communication channel 30.

The second information processing device 1-3 receives the image data (ID) and the first event image data EID-1) via the communication channel 30.

Then, the second processor 40 inputs the image data (ID) and the first event image data (EID-1) into the neural network 44, wherein the neural network 44 outputs first updated image data (UID-1; not shown in FIG. 6).

At 83, the first processor 20 obtains second events (EV-2) from the event camera 3 which are acquired during a time interval between 82 and 83 and, moreover, the first processor 20 obtains second event image data (EID-2) therefrom.

The second events (EV-2) are generated by a small region of the event image pixel sensor and some other event image pixels distributed randomly, as illustrated in FIG. 6.

Then, the first processor 20 detects a region of interest (RI) in the scene, based on the image data (ID) and the second event image data (EID-2).

For example, at 81, the first processor 20 has detected that the object (O) and the first person (p1) are present in certain image pixel regions. Moreover, the first processor 20 detects that a number of events are generated in an event image pixel region that indicates a large dynamic in that region and that corresponds to the image pixel region where the first person (P1) is present.

Hence, the first processor 20 only transmits the second event image data (EID-2) corresponding to the region of interest (RI) to the second information processing device 1-3 via the communication channel 30.

The second information processing device 1-3 receives the second event image data (EID-2) via the communication channel 30.

Then, the second processor 40 inputs the first updated image data (UID-1) corresponding to the region of interest (RI) and the second event image data (EID-2) corresponding to the region of interest (RI) into the neural network 44, wherein the neural network 44 outputs second updated image data (UID-2; not shown) corresponding to the region of interest (RI).

The second processor 40 may further replace the image data in the first updated image data (UID-1) corresponding to the region of interest (RI) with the second updated image data (UID-2) corresponding to the region of interest (RI) to obtain third updated image data.

At 84, the first processor 20 obtains third events (EV-3) from the event camera 3 which are acquired during a time interval between 83 and 84 and, moreover, the first processor 20 obtains third event image data (EID-3) therefrom.

The third events (EV-3) are generated by a border region of the event image pixel sensor and a total number of the third events (EV-3) exceeds a predetermined threshold.

The first processor 20 inputs the third event image data (EID-3) into a machine learning algorithm (not shown; not to be confused with the neural network 44), wherein the machine learning is trained to detect whether a predetermined change (PC) in the scene has occurred which is represented in the third event image data (EID-3).

The first processor 20 detects that a predetermined change has occurred in the scene and instructs the camera 2 to acquire second image data representing a second image of the scene (a current image of the scene).

Hence, at 85, the camera 2 acquires second image data (ID-2) representing a current image of the scene into which a second person (P2) has entered in addition to the static object (O) and the first person (P1). The camera 2 transmits the image data (ID) over the first data bus 21 to the first processor 20.

Then, the first processor 20 outputs the second image data (ID-2) to the first communication interface 23 which transmits the second image data (ID-2) via the communication channel 30 to the second information processing device 1-3.

Then, the second information processing device 1-3 starts the image update process based on the second image data (ID-2) and event image data (obtained after the current image is captured) from the first information processing device 1-1 or 1-2 again.

Figure 7:
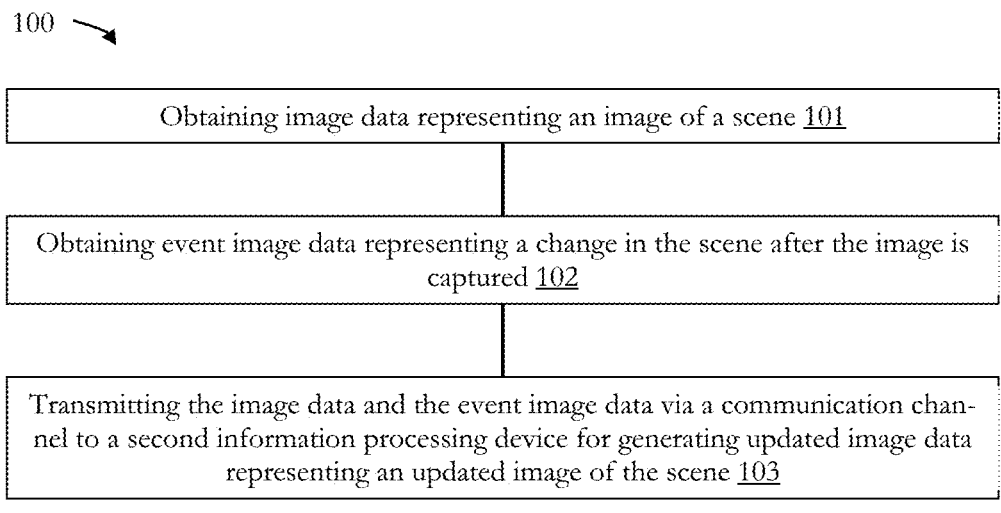
FIG. 7 schematically illustrates an embodiment of an information processing method.

FIG. 7 schematically illustrates an embodiment of an information processing method 100.

The information processing method 100 may be performed by the first information processing device as described herein.

At 101, image data representing an image of a scene is obtained, as described herein.

At 102, event image data representing a change in the scene after the image is captured is obtained, as described herein.

At 103, the image data and the event image data are transmitted via a communication channel to a second information processing device for generating updated image data representing an updated image of the scene, as described herein.

Figure 8:
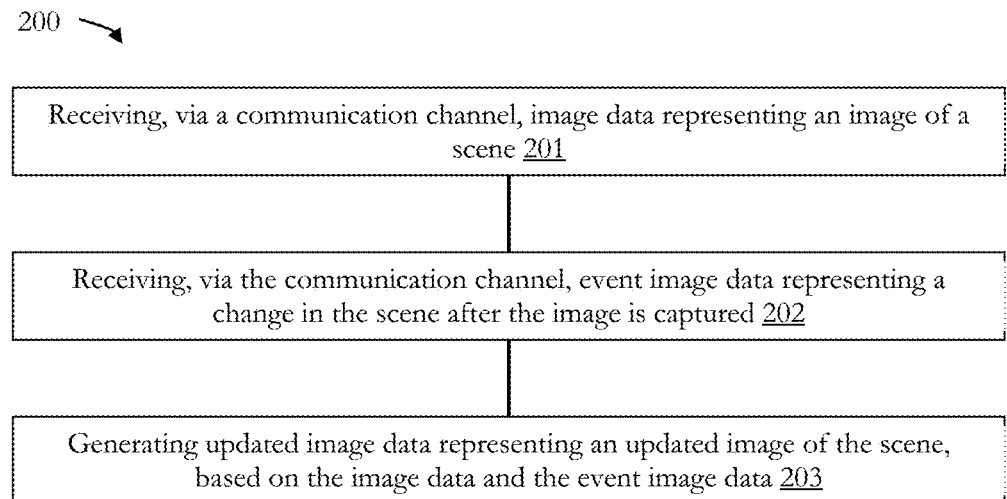
FIG. 8 schematically illustrates an embodiment of an information processing method.

FIG. 8 schematically illustrates an embodiment of an information processing method 200.

The information processing method 200 may be performed by the second information processing device as described herein.

At 201, via a communication channel, image data representing an image of a scene is received, as described herein.

At 202, via the communication channel, event image data representing a change in the scene after the image is captured is received, as described herein.

At 203, updated image data representing an updated image of the scene are generated, based on the image data and the event image data.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An information processing device, including circuitry configured to:

obtain image data representing an image of a scene;

obtain event image data representing a change in the scene after the image is captured; and transmit the image data and the event image data via a communication channel to a second information processing device for generating updated image data representing an updated image of the scene.

(2) The information processing device of (1), wherein the circuitry is further configured to adapt a rate at which the event image data is transmitted, based on a number of events generated within a predetermined time interval.

(3) The information processing device of (2), wherein the circuitry is further configured to transmit events asynchronously, instead of transmitting the event image data, when a number of events generated within a predetermined time interval exceeds a predetermined threshold.

(4) The information processing device of anyone of (1) to (3), wherein the circuitry is further configured to:

instruct a camera to acquire second image data representing a second image of the scene;

transmit the second image data to the second information processing device; and adapt a rate at which the camera is instructed to acquire the second image data and at which the second image data is transmitted to the second information processing device, based on a number of events generated within a predetermined time interval.

(5) The information processing device of anyone of (1) to (4), wherein the circuitry is further configured to detect whether a predetermined change has occurred in the scene, based on the event image data.

(6) The information processing device of (5), wherein the circuitry is further configured to:

instruct, when the predetermined change is detected, a camera to acquire second image data representing a second image of the scene; and transmit the second image data to the second information processing device.

(7) The information processing device of anyone of (1) to (6), wherein the circuitry is further configured to detect a region of interest in the scene, based on at least one of the image data and the event image data.

(8) The information processing device of (7), wherein the circuitry is further configured to transmit only the part of the event image data corresponding to the region of interest.

(9) The information processing device of (7) or (8), wherein the circuitry is further configured to adapt a rate at which the event image data is transmitted, based on a number of events generated in the region of interest within a predetermined time interval.

(10) The information processing device of anyone of (1) to (9), wherein the circuitry includes a camera configured to acquire the image data.

(11) The information processing device of anyone of (1) to (10), wherein the circuitry includes an event camera configured to acquire events representing the event image data.

(12) An information processing device, including circuitry configured to:

receive, via a communication channel, image data representing an image of a scene;

receive, via the communication channel, event image data representing a change in the scene after the image is captured; and generate updated image data representing an updated image of the scene, based on the image data and the event image data.

(13) The information processing device of (12), wherein the circuitry is further configured to input the image data and the event image data into a neural network, wherein the neural network is trained to generate the updated image data based on the image data and the event image data.

(14) The information processing device of (12) or (13), wherein the circuitry is further configured to receive, via the communication channel, events asynchronously, instead of receiving the event image data, and to generate the updated image data based on the received events.

(15) A video streaming system, including:

a first information processing device, including circuitry configured to:

obtain image data representing an image of a scene, obtain event image data representing a change in the scene after the image is captured, transmit the image data and the event image data via a communication channel to a second information processing device for generating updated image data representing an updated image of the scene; and the second information processing device, including circuitry configured to:

receive, via the communication channel, the image data, receive, via the communication channel, the event image data, generate the updated image data, based on the image data and the event image data.

(16) The video streaming system of (15), wherein the circuitry of the second information processing device is further configured to input the image data and the event image data into a neural network, wherein the neural network is trained to generate the updated image data based on the image data and the event image data.

(17) The video streaming system of (15) or (16), wherein the circuitry of the first information processing device is further configured to transmit events asynchronously, instead of transmitting the event image data, when a number of events generated within a predetermined time interval exceeds a predetermined threshold.

(18) The video streaming system of (17), wherein the circuitry of the second information processing device is further configured to receive, via the communication channel, the events asynchronously, instead of receiving the event image data, and to generate the updated image data based on the received events.

(19) An information processing method, including:

obtaining image data representing an image of a scene;

obtaining event image data representing a change in the scene after the image is captured; and transmitting the image data and the event image data via a communication channel to a second information processing device for generating updated image data representing an updated image of the scene.

(20) An information processing method, including:

receiving, via a communication channel, image data representing an image of a scene;

receiving, via the communication channel, event image data representing a change in the scene after the image is captured; and generating updated image data representing an updated image of the scene, based on the image data and the event image data.

(21) A computer program comprising program code causing a computer to perform the method according to (19), when being carried out on a computer.

(22) A non-transitory computer-readable recording medium that stores therein a computer program product, which, when executed by a processor, causes the method according to (19) to be performed.

(23) A computer program comprising program code causing a computer to perform the method according to (20), when being carried out on a computer.

(24) A non-transitory computer-readable recording medium that stores therein a computer program product, which, when executed by a processor, causes the method according to (20) to be performed.

The invention claimed is:

1. An information processing device, comprising circuitry configured to:

obtain image data representing an image of a scene from a camera having a first field-of-view;

obtain event image data representing a change in the scene after the image is captured, wherein the event image data is obtained from an event camera having a second field-of-view, wherein the camera and the event camera are calibrated such that the first field-of-view and the second field-of-view have a predetermined overlapping region, wherein the circuitry is configured to process only the image data corresponding to the predetermined overlapping region, and wherein the event image data corresponds to events detected only within the predetermined overlapping region;

transmit the image data and the event image data via a communication channel to a second information processing device for generating updated image data representing an updated image of the scene; and detect a region of interest in the scene based on a number of events generated in a region of the scene within a predetermined time interval, wherein the region of interest corresponds to a part of the scene assigned a higher importance than a rest of the scene, and transmit only the part of the event image data corresponding to the region of interest, wherein the region of interest corresponds to a part of the scene and is based on a number of events generated in a region of the scene indicating a larger dynamic of the region of the scene.

2. The information processing device according to claim 1, wherein the circuitry is further configured to adapt a rate at which the event image data is transmitted, based on a number of events generated within a predetermined time interval.

3. The information processing device according to claim 2, wherein the circuitry is further configured to transmit events asynchronously, instead of transmitting the event image data, when a number of events generated within a predetermined time interval exceeds a predetermined threshold.

4. The information processing device according to claim 1, wherein the circuitry is further configured to:

instruct a camera to acquire second image data representing a second image of the scene;

transmit the second image data to the second information processing device; and adapt a rate at which the camera is instructed to acquire the second image data and at which the second image data is transmitted to the second information processing device, based on a number of events generated within a predetermined time interval.

5. The information processing device according to claim 1, wherein the circuitry is further configured to detect whether a predetermined change has occurred in the scene, based on the event image data.

6. The information processing device according to claim 5, wherein the circuitry is further configured to:

instruct, when the predetermined change is detected, the camera to acquire second image data representing a second image of the scene; and transmit the second image data to the second information processing device.

7. The information processing device according to claim 1, wherein the circuitry is further configured to detect a region of interest in the scene, based on at least one of the image data and the event image data.

8. The information processing device according to claim 7, wherein the circuitry is further configured to transmit only the part of the event image data corresponding to the region of interest.

9. The information processing device according to claim 7, wherein the circuitry is further configured to adapt a rate at which the event image data is transmitted, based on a number of events generated in the region of interest within a predetermined time interval.

10. An information processing device, comprising circuitry configured to:

receive, via a communication channel, image data representing an image of a scene from a camera having a first field-of-view;

receive, via the communication channel, event image data representing a change in the scene after the image is captured, wherein the event image data is obtained from an event camera having a second field-of-view, wherein the camera and the event camera are calibrated such that the first field-of-view and the second field-of-view have a predetermined overlapping region, wherein the circuitry is configured to process only the image data corresponding to the predetermined overlapping region, and wherein the event image data corresponds to events detected only within the predetermined overlapping region;

generate updated image data representing an updated image of the scene, based on the image data and the event image data; and detect a region of interest in the scene based on a number of events generated in a region of the scene within a predetermined time interval, wherein the region of interest corresponds to a part of the scene assigned a higher importance than a rest of the scene, and generate the updated image data based on the region of interest represented in the event image data, wherein the region of interest corresponds to a part of the scene and is based on a number of events generated in a region of the scene indicating a larger dynamic of the region of the scene.

11. The information processing device according to claim 10, wherein the circuitry is further configured to input the image data and the event image data into a neural network, wherein the neural network is trained to generate the updated image data based on the image data and the event image data.

12. The information processing device according to claim 10, wherein the circuitry is further configured to receive, via the communication channel, events asynchronously, instead of receiving the event image data, and to generate the updated image data based on the received events.

13. A video streaming system, comprising:

a first information processing device, including first circuitry configured to:

obtain image data representing an image of a scene from a camera having a first field-of-view, obtain event image data representing a change in the scene after the image is captured, wherein the event image data is obtained from an event camera having a second field-of-view, wherein the camera and the event camera are calibrated such that the first field-of-view and the second field-of-view have a predetermined overlapping region, wherein the circuitry is configured to process only the image data corresponding to the predetermined overlapping region, and wherein the event image data corresponds to events detected only within the predetermined overlapping region, transmit the image data and the event image data via a communication channel to a second information processing device for generating updated image data representing an updated image of the scene, detect a region of interest in the scene based on a number of events generated in a region of the scene within a predetermined time interval, wherein the region of interest corresponds to a part of the scene assigned a higher importance than a rest of the scene, and transmit only the part of the event image data corresponding to the region of interest, wherein the region of interest corresponds to a part of the scene and is based on a number of events generated in a region of the scene indicating a larger dynamic of the region of the scene; and the second information processing device, including second circuitry configured to:

receive, via the communication channel, the image data, receive, via the communication channel, the event image data, generate the updated image data, based on the image data and the event image data.

14. The video streaming system according to claim 13, wherein the circuitry of the second information processing device is further configured to input the image data and the event image data into a neural network, wherein the neural network is trained to generate the updated image data based on the image data and the event image data.

15. The video streaming system according to claim 13, wherein the circuitry of the first information processing device is further configured to transmit events asynchronously, instead of transmitting the event image data, when a number of events generated within a predetermined time interval exceeds a predetermined threshold.

16. The video streaming system according to claim 15, wherein the circuitry of the second information processing device is further configured to receive, via the communication channel, the events asynchronously, instead of receiving the event image data, and to generate the updated image data based on the received events.

* * * * *